(12) United States Patent
Vielhuber (10) Patent No.: US 11,338,303 B2
(45) Date of Patent: May 24, 2022

(54) BEARING ARRANGEMENT OF A SCREW OF A SOLID BOWL SCREW CENTRIFUGE

(71) Applicant: Flottweg SE, Vilsbiburg (DE)

(72) Inventor: Benno Vielhuber, Vilsbiburg (DE)

(73) Assignee: Flottweg SE, Vilsbiburg (DE)

( * ) Notice: Subject to any disclaimer, the term of this patent is extended or adjusted under 35 U.S.C. 154(b) by 623 days.

(21) Appl. No.: 16/073,234

(22) PCT Filed: Jan. 18, 2017

(86) PCT No.: PCT/DE2017/100023
§ 371 (c)(1),
(2) Date: Jul. 26, 2018

(87) PCT Pub. No.: WO2017/129166
PCT Pub. Date: Aug. 3, 2017

(65) Prior Publication Data
US 2020/0164387 A1    May 28, 2020

(30) Foreign Application Priority Data
Jan. 29, 2016   (DE) ..................... 10 2016 101 574.1

(51) Int. Cl.
*B04B 9/12*    (2006.01)
*B04B 1/20*    (2006.01)
*F16C 27/06*   (2006.01)

(52) U.S. Cl.
CPC ................. *B04B 9/12* (2013.01); *B04B 1/20* (2013.01); *F16C 27/06* (2013.01)

(58) Field of Classification Search
CPC ...... B04B 9/12; B04B 1/20; B04B 9/04; F16C 33/6685; F16C 33/6659; F16C 33/667; F16C 37/007; F16C 2320/42; F16C 27/06; F16C 27/066
USPC .............................. 384/467, 476; 494/15, 53
See application file for complete search history.

(56) References Cited

U.S. PATENT DOCUMENTS

| | | | |
|---|---|---|---|
| 1,399,959 A | 12/1921 | Hanson | |
| 1,448,189 A | 3/1923 | Brunner | |
| 1,823,863 A * | 9/1931 | Roberts | B04B 9/12 384/195 |
| 2,040,351 A * | 5/1936 | Williams | B04B 9/12 384/196 |
| 2,827,229 A | 3/1958 | Josef | |
| 2,942,494 A * | 6/1960 | Gooch | B04B 9/12 464/51 |
| 2,986,432 A * | 5/1961 | Schlauch | F16C 27/066 384/536 |
| 3,148,145 A * | 9/1964 | Reed | B04B 1/20 494/53 |

(Continued)

FOREIGN PATENT DOCUMENTS

| | | |
|---|---|---|
| DE | 2152309 A1 | 5/1972 |
| DE | 2807411 A1 | 8/1978 |

(Continued)

*Primary Examiner* — Charles Cooley
(74) *Attorney, Agent, or Firm* — Smartpat PLC (57) ABSTRACT

In a bearing arrangement of a screw of a solid bowl screw centrifuge, having a centrifuge axis, a first axial bearing and a second axial bearing, which are provided for taking up an axial force of the screw, an elastic member is provided, on which the second axial bearing is supported for supporting the axial force of the screw in the axial direction.

12 Claims, 6 Drawing Sheets

(56) References Cited

U.S. PATENT DOCUMENTS

| | | | | |
|---|---|---|---|---|
| 3,186,779 A | * | 6/1965 | Chapman | F16C 33/6666 384/535 |
| 3,228,596 A | * | 1/1966 | Reed | B04B 1/20 494/41 |
| 3,588,204 A | * | 6/1971 | Abashkin | F16C 27/066 384/426 |
| 3,672,734 A | * | 6/1972 | Bando | F16C 27/066 384/536 |
| 3,729,128 A | * | 4/1973 | Reed | B04B 1/20 494/15 |
| 3,854,658 A | * | 12/1974 | Probstmeyer | B04B 15/06 494/11 |
| 4,173,376 A | | 11/1979 | Standing et al. | |
| 4,504,262 A | | 3/1985 | Forsberg | |
| 4,556,331 A | | 12/1985 | Munde et al. | |
| 4,595,302 A | * | 6/1986 | Attinger | B60B 27/02 384/558 |
| 4,666,317 A | * | 5/1987 | Holthoff | B21B 31/07 384/447 |
| 5,618,409 A | | 4/1997 | Kreill | |
| 11,198,286 B2 | * | 12/2021 | Verkuijlen | F16C 19/46 |
| 2001/0022871 A1 | * | 9/2001 | Buchheim | F16C 35/077 384/537 |
| 2013/0248280 A1 | * | 9/2013 | Stamm | F16H 25/2209 180/444 |
| 2016/0102705 A1 | * | 4/2016 | Mei | F16C 32/0442 310/90.5 |
| 2017/0335891 A1 | * | 11/2017 | Hikida | F16C 19/28 |
| 2020/0164387 A1 | * | 5/2020 | Vielhuber | B04B 1/20 |

FOREIGN PATENT DOCUMENTS

| | | |
|---|---|---|
| DE | 3414774 A1 | 10/1984 |
| DE | 4130759 A1 | 3/1993 |
| DE | 102013215554 | 11/2014 |
| DE | 102013224480 A1 | 6/2015 |
| KR | 20120046900 A | 5/2012 |

* cited by examiner

V, VI, VII, VIII, IX, X, XI

BEARING ARRANGEMENT OF A SCREW OF A SOLID BOWL SCREW CENTRIFUGE

TECHNICAL FIELD

The invention relates to a bearing arrangement of a screw of a solid bowl screw centrifuge, having a centrifuge axis, a first axial bearing and a second axial bearing, in particular of a bearing location which is provided for taking up an axial force of the screw.

BACKGROUND

Solid bowl screw centrifuges, also known as decanters, continuously separate free-flowing material mixtures with a drum which rotates at a speed about a centrifuge axis, in most cases a light and a heavy phase. The heavy phase is pushed inside the drum by a screw to an end region of the drum. The screw is situated for this in the drum and likewise rotates about the centrifuge axis. It rotates relative to the drum speed with a difference speed. When the heavy phase is pushed in the conveying direction, an axial force acts against the conveying direction. The axial force is taken up by a bearing arrangement of the screw. The bearing arrangement comprises at least one axial bearing for this purpose. Solid bowl screw centrifuges are also known, which have a first and a second axial bearing which both take up the axial force of the screw in the axial direction.

Although such bearing arrangements with a plurality of axial bearings can take up altogether higher axial forces than individual axial bearings, it may however occur that individual axial bearings of these bearing arrangements become defective.

The object of the invention is to create a bearing arrangement in which a plurality of axial bearings are present, but which have a longer service life compared with known designs.

SUMMARY

This object is achieved according to the invention with a bearing arrangement of a screw of a solid bowl centrifuge with a centrifuge axis, a first axial bearing and a second axial bearing which are provided for taking up an axial force of the screw, wherein an elastic member is provided at which the second axial bearing for supporting the axial force of the screw is supported in the axial direction.

In conventional bearing arrangements for the screw of a solid bowl screw centrifuge with two axial bearings, it is difficult to calculate how the respective axial bearing is loaded with the axial force of the screw. According to the invention, it has been found that in such bearing arrangements it repeatedly occurs that individual axial bearings are loaded beyond their loading limit.

In the case of the bearing arrangement according to the invention, however, an elastic member is provided at which the second axial bearing is supported for supporting the axial force of the screw in the axial direction. An elastic member has the property that it changes its form under a force action and reverts back to its original form when this force action decreases. An elastic member has, in contrast to the force action, an elasticity which can be specified with a spring constant. At such elastic member, according to the invention the second bearing is supported in such a manner, whereby then the elastic member is correspondingly compressed with increasing axial force of the screw. The elastic member decreases with the compression and the screw moves in the axial direction. With the movement of the screw in the axial direction, an increasing axial force is then exerted on the first axial bearing. At the same time, it is ensured by the elastic member according to the invention that the second axial bearing cannot be overloaded.

In order in particular to load both axial bearings equally with the axial force, according to the invention the spring constant of the elastic member is chosen such that the maximum force arising on the two axial bearings is distributed equally. Thus, overloading of the first axial bearing can also be avoided. In addition to this advantage, the elastic member can in particular constructional situations also absorb impacts and oscillations of the screw and changes of shape of constructional components, such as for example change of thermal length or abrasion due to wear.

The force distribution according to the invention has the effect that the axial force is distributed and limited to each axial bearing. The individual loading of each respective axial bearing thus amounts at most to only half of the maximum axial force. The respective axial bearing can thus be dimensioned particularly small. With such small axial bearings, the radial constructional height of the bearing arrangement is also particularly small. The small radial constructional height of the bearing arrangement is of advantage in particular when work is to be carried out in the solid bowl screw centrifuge with a large pond depth. This means that the material situated in the solid bowl screw centrifuge reaches radially far inwards and accordingly for the hub of the screw there and its bearing arrangement in the radial direction only a small constructional space remains.

Advantageously, the elastic member is arranged between the first and the second axial bearing. In this arrangement of the elastic member, the latter is thus situated directly between the two axial bearings and utilizes the constructional space present there. At the same time, with a loading and displacing of the second axial bearing, the elastic member is compressed directly. This arrangement thus has otherwise only a small residual elasticity. An increasing axial force of the screw therefore leads directly to a compression of the elastic member and therefore associated, correspondingly immediate transmitting of the axial force to the first axial bearing.

Furthermore, advantageously the first and the second axial bearing are each designed with a bearing inner ring and a bearing outer ring. The elastic member in this case is arranged between the two bearing inner rings, and between the two bearing outer rings there is arranged a less-elastic, in particular non-elastic member. The bearing inner ring is, in relation to its axis of rotation, which in the present case is the centrifuge axis of the radially inner ring. The bearing outer ring is correspondingly the radially outer ring. The elastic member is then arranged between the two end sides facing one another in the axial direction. The elastic member is, in one and the same force action, more highly compressed than the less-elastic or non-elastic member. As a result, on the action of the axial force of the screw on the bearing of this kind, the bearing outer rings of both axial bearings are displaced. At the same time, the bearing inner ring of one axial bearing is displaced relative to the bearing inner ring of the other axial bearing. As a result, the spatial situations and thus the load situations of the axial bearings are altered between the bearing outer rings and the associated bearing inner rings.

Alternatively, advantageously the first and the second axial bearing are each designed with a bearing inner ring and a bearing outer ring, and at the same time the elastic member is arranged between the two bearing outer rings and between the two bearing inner rings there is arranged a less-elastic, in particular a non-elastic member. This embodiment is constructed functionally reversed with respect to the last embodiment explained above. Accordingly, in this embodiment there can be used somewhat differently designed axial bearings which may be particularly advantageous in certain constructional situations.

Furthermore, preferably the second axial bearing is designed as a spindle bearing and the first axial bearing as a groove ball bearing. A spindle bearing and a groove ball bearing are axial bearings in different constructional form. Both constructional forms have in particular spherical rolling bodies which run between a bearing inner ring and a bearing outer ring each on a running track. The running track has a pressure angle or contact angle relative to the radial direction of the axial bearing. The pressure angle of the running tracks of groove ball bearings is generally 0° (in words: zero degrees). In the case of spindle bearings the pressure angle is generally between 10 and 30° (in words: ten and thirty degrees), particularly advantageously between 20 and 30° (in words: twenty and thirty degrees). The greater the pressure angle, the higher the axial force the spindle bearing can take up. By the fact that the pressure angle of the spindle bearing being adapted to the axial force, the bearing arrangement according to the invention can be easily dimensioned. The groove ball bearing takes up particularly forces in the radial direction. In the axial direction, such a radial ball bearing takes up in fact only particular forces. According to the invention, however, it can nevertheless be used particularly advantageously, because it is ensured that it is not overloaded in the axial direction. As a result, the advantage can also be utilized whereby radial ball bearings are of low cost, low maintenance and readily available.

Alternatively, furthermore the second axial bearing is designed as an angular contact ball bearing and the first axis as a groove ball bearing. An angular contact ball bearing has generally a pressure angle between 15 and 60° (in words: fifteen and sixty degrees), particularly preferably between 40 and 50° (in words: forty and fifty degrees). The pressure angle also influences the take-up of axial force in this bearing form. An angular contact ball bearing can take up more axial force than a spindle ball bearing, owing to the greater pressure angle. An angular contact ball bearing is accordingly advantageous in the case of a larger axial force.

In a preferred manner the second axial bearing is designed as an angular contact ball bearing and the first axial bearing as a four-point bearing. A four-point bearing has in particular a pressure angle around 35° (in words: thirty five degrees). In the case of a four-point bearing the rolling bodies there have four contact points on the respective running path. Four-point bearings furthermore have advantageously a separated bearing inner ring or a separated bearing outer ring. Owing to bearing rings separated in this manner, it is possible to construct in a four-point bearing more rolling bodies than in an angular contact ball bearing of the same size. Owing to their large size, four-point bearings can take up both a comparatively large axial force and a large radial force. Additionally to this, four-point bearings are easy to mount owing to the separated bearing rings.

Furthermore, advantageously the second axial bearing is designed as a conical roller bearing and the first axial bearing as a groove ball bearing. In the case of conical roller bearings, in contrast to the above-mentioned bearings, the rolling bodies are not of spherical, but conical form. The rolling bodies of the conical roller bearing do not run on a running path, but on a comparatively wide running surface. Conical roller bearings can take up a very high axial force and a very high radial force. Moreover, conical roller bearings are particularly easy to mount, since their bearing outer ring is loose and can be separately mounted.

Particularly preferably, there is provided furthermore a third axial bearing for taking-up an axial force of the screw and a further elastic member, on which the third axial bearing is supported in the axial direction. The third axial bearing in this arrangement is connected in series in addition to the two other axial bearings. The third axial bearing has the effect that the axial force is distributed over these three axial bearings. The only loading of the respective axial bearing is thus preferably only a third of the maximum axial force. The respective axial bearing can thus be designed particularly small.

According to the invention, particularly preferably, the elastic member, in particular the further elastic member, has a pretension. The pretension results in particular by the elastic member being already precompressed in the installed state. The precompression of the elastic member of this kind is brought about by a pretension force such that a force is exerted by the latter on the adjacent constructional parts already in the rest state. The pretension force of the elastic member is preferably in the range of 2,500 to 300,000 Newtons (in words two thousand five hundred to three hundred thousand Newtons). In particular in small solid bowl screw centrifuges in the range of 2,500 to 10,000 Newtons (in words: two thousand five hundred to ten thousand Newtons). In medium-size solid bowl screw centrifuges in the range of 10,000 to 100,100 (in words: ten thousand to one hundred thousand Newtons), in particular 30,000 Newtons (in words: thirty thousand Newtons) and in large solid bowl screw centrifuges in the range of 100,000 to 300,000 (in words: one hundred thousand to three hundred thousand Newtons). The pretension force corresponds in two axial bearings preferably to half the maximum axial force in the operating state. The pretension force has the effect in particular that in the rest state both bearings are loaded with axial forces opposite to another. In the case of an axial force of the screw in the operating state being less than the pretension force, the second axial bearing is additionally loaded with axial force and the first axial bearing is relieved. If the axial force arising is equal to the pretension force, no more axial force acts on the first axial bearing. In the case of an axial force greater than the pretension force, an axial force acts on both axial bearings only in one direction. Surprisingly, it has been found that with such a pretension the associated axial bearings are particularly evenly loaded and the maintenance intervals and replacement intervals of the axial bearings can be determined particularly easily.

BRIEF DESCRIPTION OF THE DRAWINGS

An exemplary embodiment of the solution according to the invention is explained in more detail below with the aid of the schematic drawings, in which.

DETAILED DESCRIPTION

Figure 1:
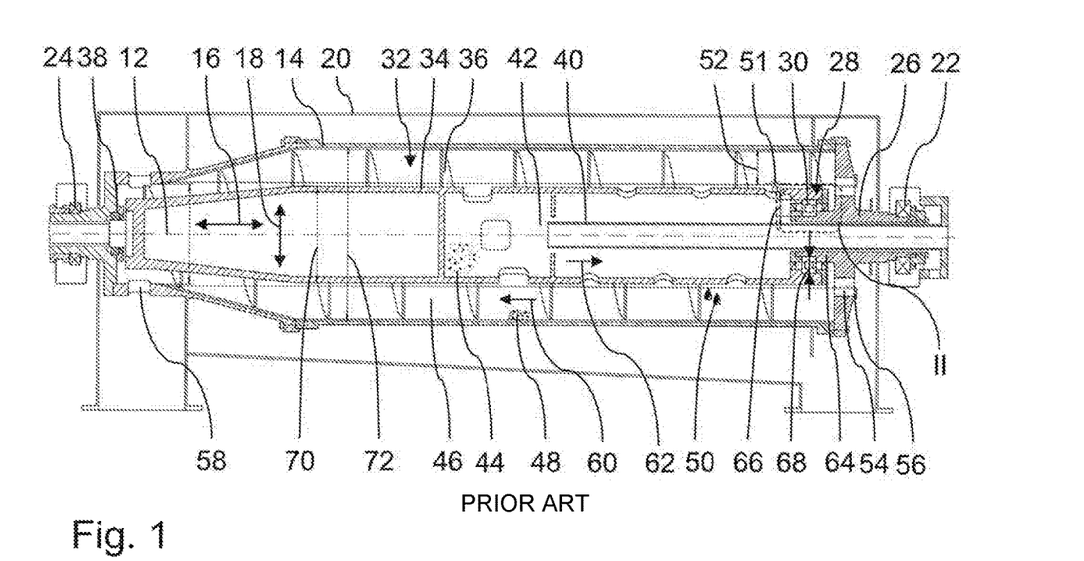
FIG. 1 shows a longitudinal section of a solid bowl screw centrifuge according to the prior art along its centrifuge axis.

FIG. 1 shows a solid bowl screw centrifuge 10 with its hollow cylindrical-shaped centrifuge drum 14 rotatable about a centrifuge axis 12. The centrifuge axis 12 defines an axial direction 16 and a radial direction 18. The centrifuge drum 14 is surrounded by a housing 20 and is mounted at its two axial end regions by means of a first drum bearing 22 and a second drum bearing 24. The first drum bearing 22 supports the centrifuge drum 14 at a drum cover 26. The drum cover 26 for its part supports a screw 32 in the centrifuge drum 14 by means of a bearing arrangement 28. The bearing arrangement 28 is designed with an axial bearing 30.

The screw 32 comprises a substantially hollow cylindrical-shaped screw hub 34 and a screw helix 36 surrounding it radially on the outside. The screw 34 is rotatably supported at its one axial end region by means of the bearing arrangement 28 and at its other axial end region by means of a screw bearing 38 inside the centrifuge drum 14.

An inlet pipe 40 leads into the centrifuge drum 14 through the drum bearing 22 and the first drum cover 26. The inlet pipe 40 extends along the centrifuge axis 12 as far as an inlet space 42 inside the screw hub 34. The inlet pipe 40 serves to supply mixed material 44, in the present case clarified sludge. The mixed material 44 flows from the inlet space 42 radially outwards into a separating space 46. In the separating space 46 the mixed material 44 is respectively separated and clarified into a heavy phase 48, in the present case dewatered clarified liquid, and into a light phase 50, in the present case clarified liquid. The heavy phase 48 flows, owing to the centrifugal force arising in the radial direction 18, outwards and settles on the inside of the centrifuge drum 14. The light phase 50 floats radially inwards on the heavy phase 48.

Both phases 48 and 50 produce in the separating space 46 together a liquid state 51. The distance of the liquid state 51 to the inside of the centrifuge drum 14 is usually referred to as the pond depth 52. The pond depth 52 is determined by outlet openings 54, at which for this purpose a weir plate 56 is provided for defined retention of the light phase 50. The outlet openings 54 are formed in the drum cover 26 around the centrifuge axis 12. The weir plates 56 are overflown by escaping light phase 50. Their radial position thus defines the pond depth 52.

At the end region of the centrifuge drum 14 opposite the first drum cover 26, there are situated on the outside in the radial direction discharge openings 58 for the heavy phase 48. The heavy phase 48 is, for this purpose, axially fixed by means of the screw helix 36 in a conveying direction 60 radially inwards with respect to the discharge openings 58. The heavy phase 48 is then hurled out of the centrifuge drum 14 radially through the discharge openings 58 owing to the centrifugal force. In so doing, an axial force 62 occurs on the helical screw 36 which pushes the entire screw 32 in the direction of the drum cover 26.

At the drum cover 26 there is situated in its center around the inlet pipe 40 a tubular, inwardly protruding support region 64 which is connected to the drum cover 26 in one piece. The supporting region 64 carries or supports the bearing arrangement 28 at its end region directed into the interior of the centrifuge drum 14.

The radial height of the supporting region 64, a bearing height 66 of the bearing arrangement 28 and a wall thickness 68 of the screw hub 34 together define an outside diameter 70 of the screw hub 34. The outer diameter 70 of the screw hub 34 and an inner diameter 72 of the centrifuge drum 14 determine at the same time the maximum pond depth 52 of the solid bowl screw centrifuge.

Figure 2:
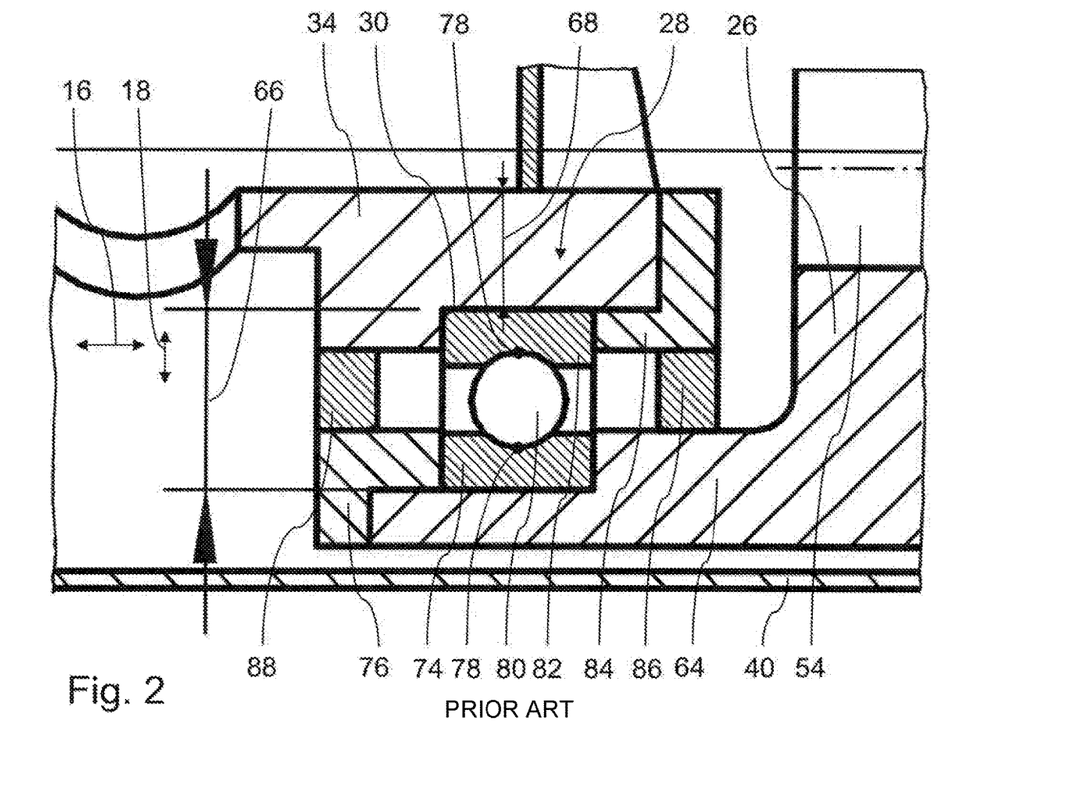
FIG. 2 shows the detail II according to FIG. 1.

FIG. 2 shows a bearing arrangement 28 according to the prior art having only a single axial bearing 30. The axial bearing 30 comprises in the radial direction 18 inwards a bearing inner ring 74 which is pressed onto the support region 64 of the drum cover 26. At the axially inner end of the supporting region 64 there is a fixing ring 76 which is L-shaped in cross-section and axially fixes the bearing inner ring 74 to the supporting region 64. The bearing inner ring 74 has in the radial direction 18 on the outside a bearing path 78, on which at least one spherical rolling body 80 rolls along in the circumferential direction around the bearing inner ring 74. At the rolling body 80 diametrically opposite the bearing path 78 there is situated on a bearing outer ring 82 an outer bearing path 78. The bearing outer ring 82 is pressed into the screw hub 34 and is supported axially against it. The bearing outer ring is furthermore axially fixed by means of a fixing ring 84 of L-shaped cross-section to the axial end of the screw hub 34. The screw hub 34 further has at its axial end region in the radial direction 18 a greater wall thickness 68 than at its axial end region in the radial direction 18. The greater wall thickness 68 is required in order to support the bearing outer ring 82.

In the axial direction 16 on the left and on the right of the bearing arrangement 28 there is arranged at each fixing ring 76, 84 an annular seal 86, 88 which seals the bearing arrangement 28 on both axial sides.

Figure 3:
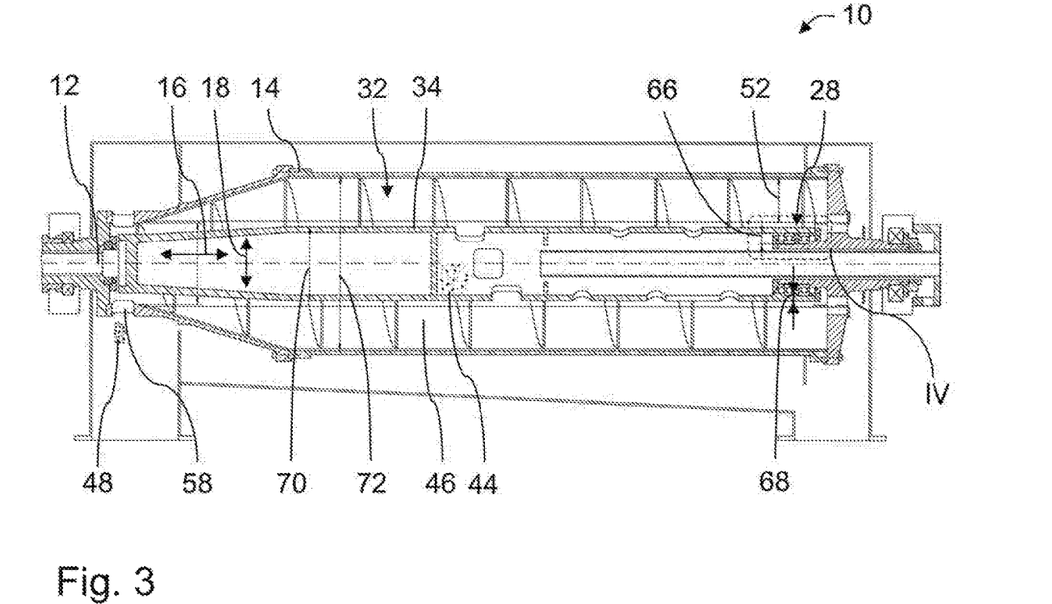
FIG. 3 shows a longitudinal section of a solid bowl screw centrifuge according to a first exemplary embodiment of the invention.

FIG. 3 shows a solid bowl screw centrifuge 10 with a first embodiment of a bearing arrangement 28 according to the invention, which is shown in detail in FIG. 1V. The solid bowl screw centrifuge 10 according to FIGS. 3 and 4 likewise comprises a centrifuge drum 14 and a screw 32, here too the bearing height 66 of the bearing arrangement 28 according to the invention being shown. This bearing height 66 is in this case less than the bearing arrangement 28 according to FIG. 1. Since the bearing height 66 is less, the outer diameter 70 of the associated screw hub 34 is also less. In addition to this, in the bearing arrangement 28 according to the invention, the wall thickness 68 of the screw hub 34 is less. The lesser wall thickness 68 in addition to the smaller bearing height 68 reduces, in addition to the smaller bearing height 66, the outer diameter 70 of the screw hub 34.

In the case of the reduced outer diameter 70 of the screw hub 34 and same inner diameter 72 of the centrifuge drum 14, the distance between the two is increased, the volume of the separating space 46 increases. With a greater distance between the centrifuge drum 14 and the screw hub 34, the pond depth 52 is, in this manner, also the pond depth 52 of the solid bowl screw centrifuge 34. The solid bowl screw centrifuge 10 according to FIGS. 3 and 4 can take up and separate more material 44 in its separating space 46.

Figure 4:
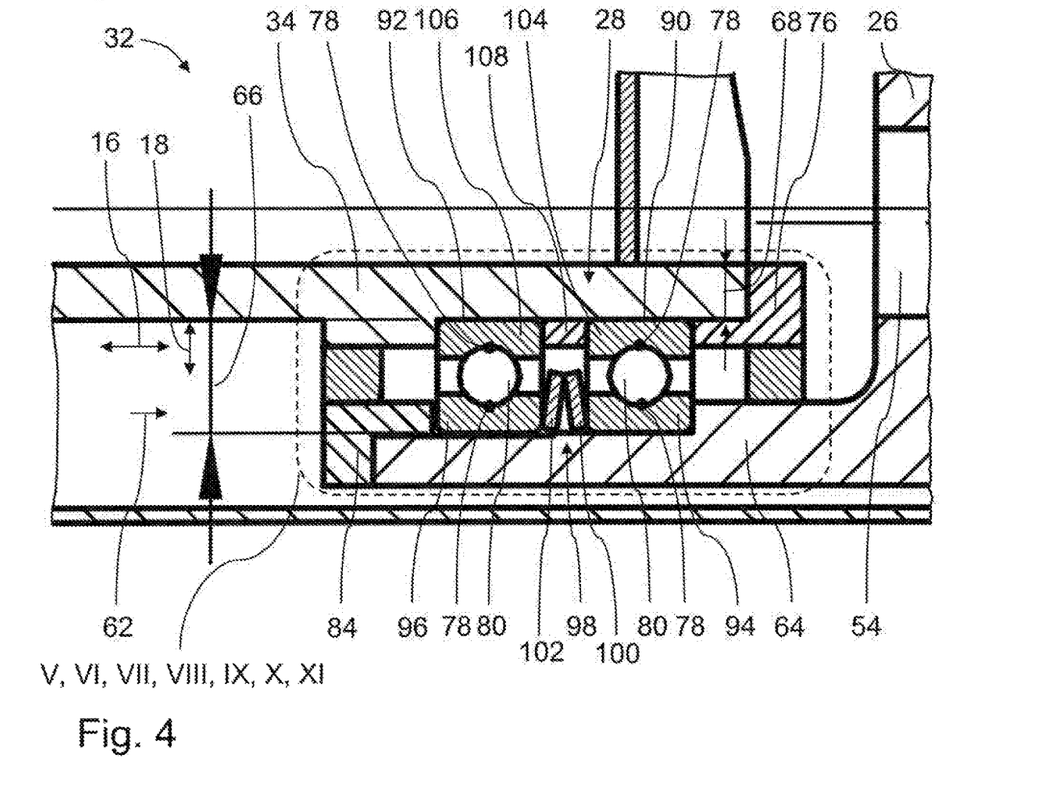
FIG. 4 shows the detail IV according to FIG. 3.

The bearing arrangement 28 comprises according to FIG. 4 in the axial direction 16 next to one another a first and a second axial bearing 90, 92. Both axial bearings 90, 92 each have a bearing inner ring 94 and 96 respectively. The two bearing inner rings 94, 96 are supported by the supporting region 64 of the drum cover 26. The bearing inner ring 94 of the first axial bearing 90 is pressed onto the supporting region 64 in a fixed manner. In this way the first axial bearing 90 is designed as a fixed bearing. In the case of the second bearing inner ring 96 the supporting region 64 is reduced in the radial direction 18 towards the centrifugal axis 12, so that the second bearing inner ring 96 is loose or movable. In this way, the second axial bearing 92 is designed as a loose bearing. Both bearing inner rings 94, 96 are furthermore held back towards the inner end of the supporting region 64 by means of the fixing ring 84 in the axial direction 16.

Between the two bearing inner rings 94, 96 there is arranged in the axial direction an annular, elastic member 98. The elastic member 98 comprises two lined-up plate springs 100, 102. The form of lining up of the two plate springs 100, 102 is also referred to as series connection. The first plate spring 100 is supported on the bearing inner ring 94 and the second plate spring 102 is supported on the bearing inner ring 96. The two plate springs 100, 102 are each disposed at a non-zero angle with respect to the radial direction 18 and are pretensioned to contact radial surfaces of the bearings 90, 92.

If such a bearing arrangement 28 is loaded by the screw 32 with axial force 62 in the direction of the drum cover 26, this axial force acts firstly on the axial bearing 92 and loads the latter. As a result, the loose bearing inner ring 96 is displaced by the axial force 62 towards the fixed bearing inner ring 94. The bearing inner ring 96 in this case presses on the plate spring 102 which in turn transmits the force to the first plate spring 100. The first plate spring 100 in turn transmits the force to the first bearing inner ring 94. The two plate springs 100, 102 act in this manner against the axial force 62, which acts on the axial bearing 92, while at the same time the rest of the axial force 62 acts on the axial bearing 90. The axial force 62 is thus distributed uniformly over both bearing inner rings 94, 96 and thus distributed to both axial bearings 90 and 92, respectively.

Furthermore, both bearing inner rings 94, 96 have in axial direction 94, 96 in each case a bearing path 78 on which the spherical-shaped rolling body roll 80. In the case of the rolling bodies lying diametrically opposite, the bearing path 78 is formed in a first and second bearing outer ring 104, 106. The two bearing outer rings 104, 106 support the screw hub 34 in the axial direction 16 and radial direction 18. Both bearing outer rings 104, 106 are pressed into the screw hub 34 and held by the first fixing ring 76.

Between the two bearing outer rings 104, 106 there is arranged according to the invention in the axial direction an annular, less-elastic member 108, in particular a non-elastic member 110. The less-elastic member 108, in the present case made of rubber-like material, transmits the axial force 62 from the screw 32 to the second bearing outer ring 104. The second bearing outer ring 106 transmits the axial force 62 to the less-elastic member 108, which for its part transmits the axial force 62 damped to the first bearing outer ring 104. The first and second bearing outer ring 104 and 106 transmit the axial force 62 via their respective bearing paths 78 to the respective rolling bodies 80. The first and second bearing outer ring 104, 106 are displaced here in the axial direction 16 against the first and second bearing inner ring 94, 96.

Figure 5:
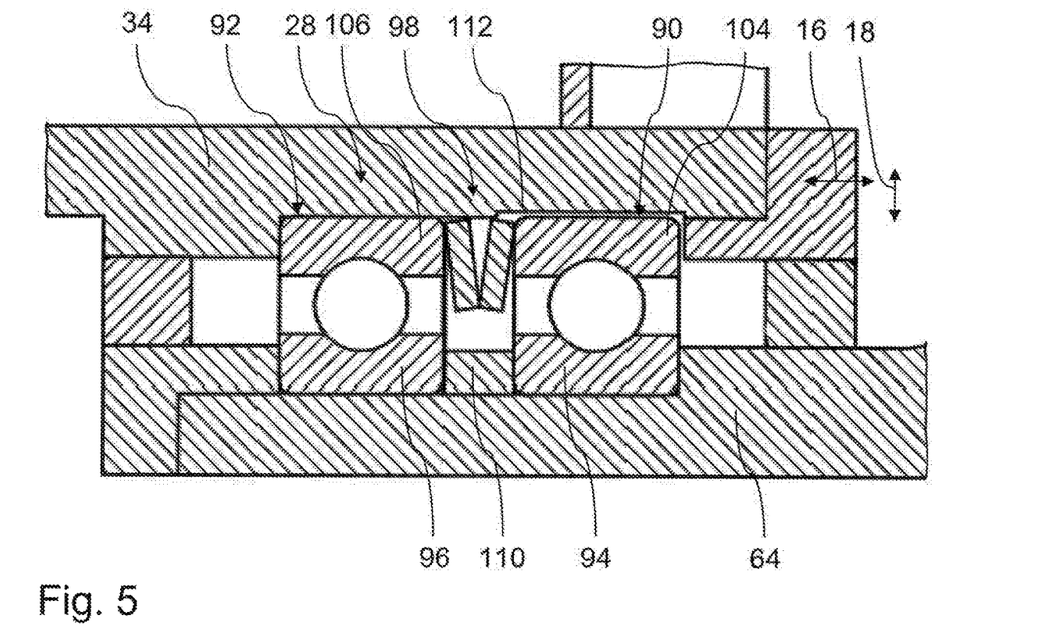
FIG. 5 shows the detail V according to FIG. 4 of a first variant.

FIG. 5 shows the bearing arrangement 28 in which the first axial bearing 90 is designed as a movable bearing and the second axial bearing 92 is designed as a fixed bearing. In the first axial bearing 90 a groove is formed for this in the region of the screw hub 34. The groove 112 has the effect that the first bearing outer ring 104 of the first axial bearing 90 is movable in the axial direction 16. The first bearing inner ring 94 of the first axial bearing 90 is in contrast pressed onto the supporting region 64.

The second axial bearing 92 is pressed with its second bearing inner ring 96 into the screw hub 34, and held by the screw hub 34 in a supporting manner. The second bearing inner ring 96 is pressed onto the supporting region 64.

In the case of this first variant of the bearing arrangement 28, furthermore the elastic member 98 and the less-elastic member 108 in particular the non-elastic member 110 are exchanged. The elastic member 98 is designed between the first and second bearing outer ring 104, 106 and the less-elastic member 108 is here designed as a non-elastic member 110 and is arranged between the first and second bearing inner ring 94, 96.

Figure 6:
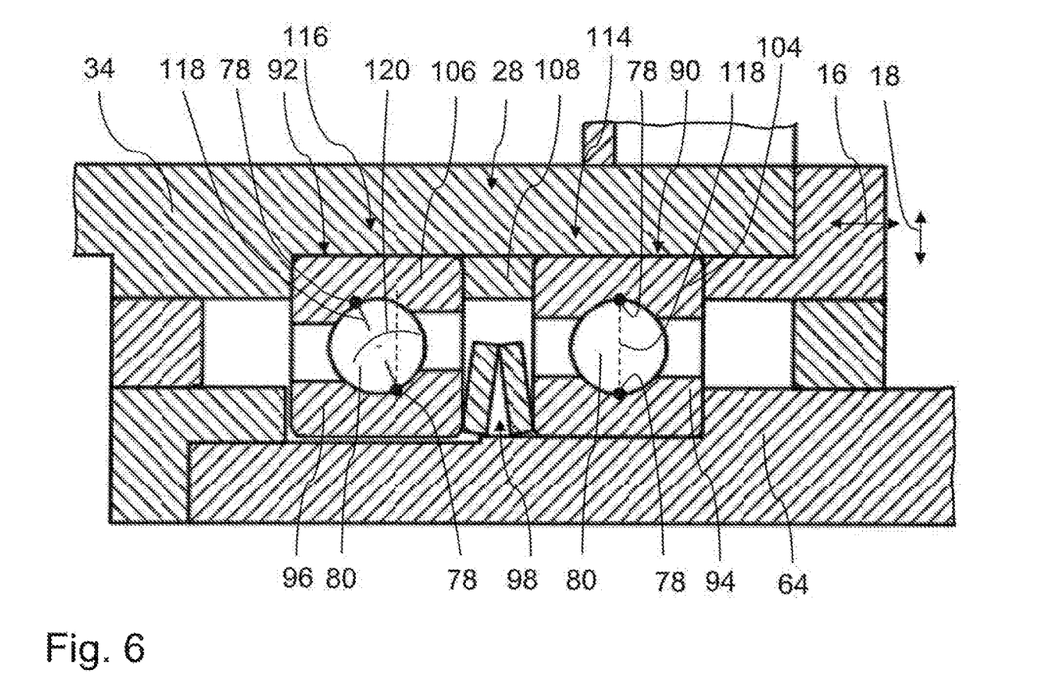
FIG. 6 shows the detail VI according to FIG. 4 of a second variant.

FIG. 6 shows the bearing arrangement 28 in which both axial bearings 90 and 92 are arranged as in FIG. 4, i.e. the first axial bearing 90 is a fixed bearing and the second axial bearing 92 is a loose bearing. The first axial bearing 90 is designed in the second variant of the bearing arrangement 28 as a groove ball bearing 114 and the second axial bearing 92 is designed as a spindle bearing 116. The groove ball bearing 114 and the spindle bearing 116 are axial bearings in a respectively different constructional form with spherical rolling bodies 80. The rolling bodies 80 run in the circumferential direction on the respective bearing inner rings 94, 96 and the respective bearing outer rings 104, 106 each on the bearing paths 78. The bearing paths 78 form in this case respectively one running path 118. The running path 118 has relative to the radial direction 18 of the respective axial bearing 90, 92 a pressure angle 120 and contact angle. The pressure angle 120 of the running path 118 of the groove ball bearing 114 is here 0 degrees (in words: zero degrees. Owing to the small pressure angle 120, it is not shown. The pressure angle 120 in the running path 118 in the spindle bearing 116 is here 25° (in words: twenty five degrees).

Figure 7:
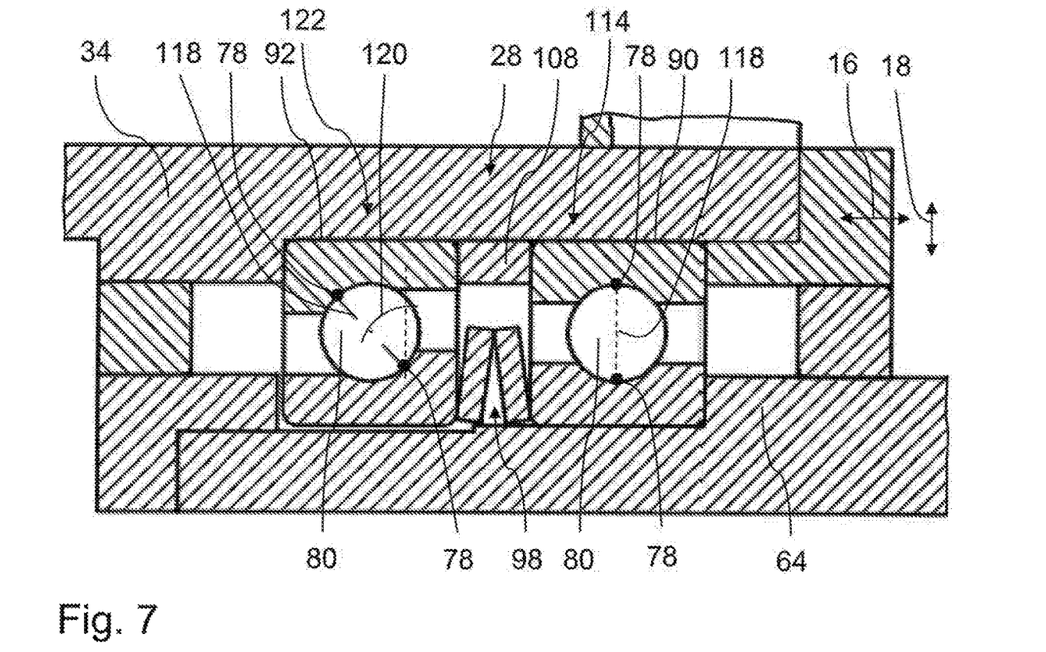
FIG. 7 shows the detail VII according to FIG. 4 of a third variant.

FIG. 7 shows the bearing arrangement 28 in which the first axial bearing 90 is designed as a groove ball bearing 114 and the second axial bearing 92 is designed as an angular contact ball bearing 122. The angular contact ball bearing 122 is a special form of the spindle bearing 116 from FIG. 6 with a pressure angle 120 between 20° and 50° (in words twenty degrees and fifty degrees). The pressure angle 120 in the angular contact ball bearing 122 is here 45° (in words: forty five degrees).

Figure 8:
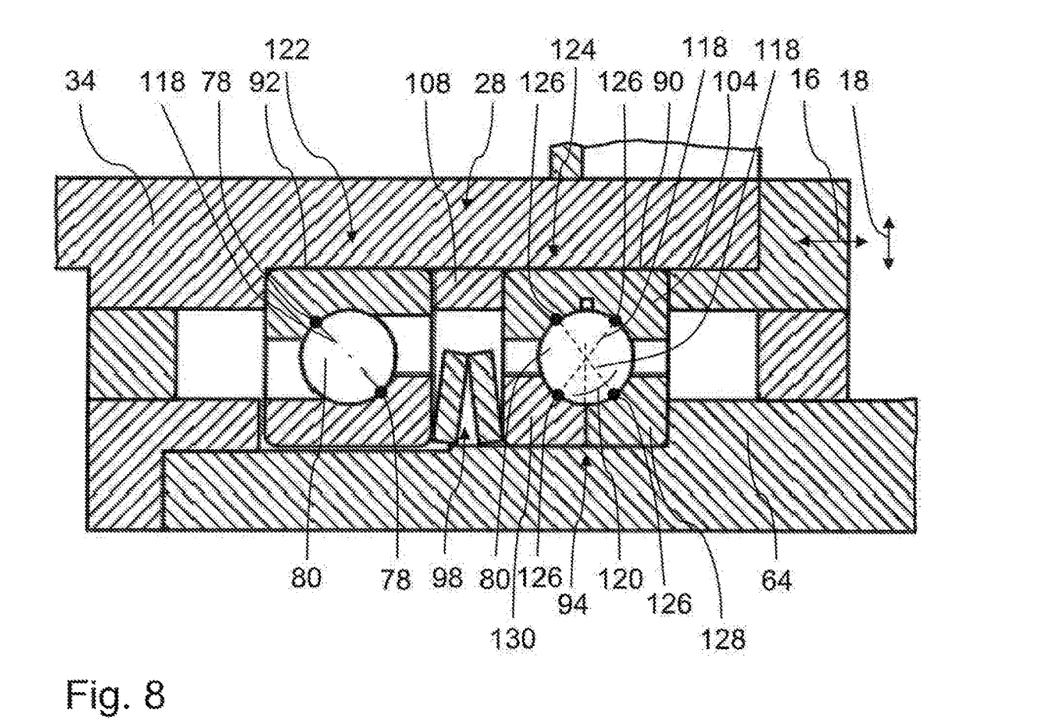
FIG. 8 shows the detail VIII according to FIG. 4 of a fourth variant.

FIG. 8 shows the bearing arrangement 28 with the second axial bearing 92 as an angular contact ball bearing 122 and the first axial bearing 90 as a four-point bearing 124. The four-point bearing 124 is a special form of the angular contact ball bearing 122 from FIG. 7. In the four-point bearing 124 there is, in contrast to the angular contact ball bearing 122, four contact points 126 of the rolling body 80. The contact points 126 of the rolling bodies 80 form in the circumferential direction four bearing paths 78. Two of the bearing paths 78 are formed on the first bearing outer ring 104 and two of the bearing paths 78 are formed on the first bearing inner ring 94. The bearing inner ring 94 is, in the four-point bearing 124, divided into a first and a second ring-shaped half 128, 130. The first and a second half 128, 130 comprise here respectively one bearing path 78 of the bearing inner ring 94. The bearing paths 78 which each lie diametrically opposite each other on the rolling body 80 each form a running path 118. The two running paths 118 in a four-point bearing 124 have a pressure angle 120 of about 35° (in words: thirty five degrees). In FIG. 8, only one pressure angle 120 of the four pressure angles 120 is shown.

Figure 9:
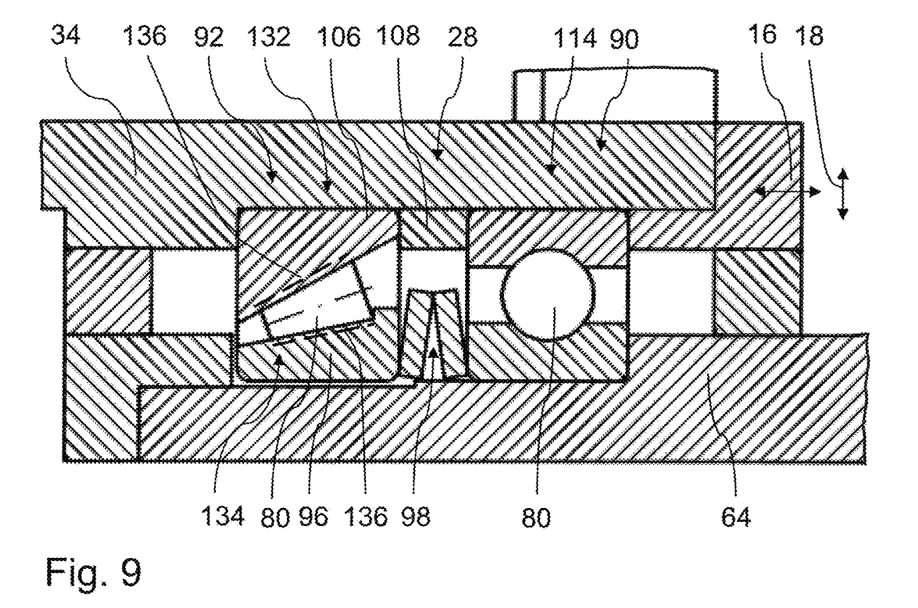
FIG. 9 shows the detail IX according to FIG. 4 of a fifth variant.

In FIG. 9 the bearing arrangement 28 is shown with the first axial bearing 90 as a groove ball bearing 114 and the second axial bearing 92 as a conical roller bearing 132. In the case of the conical roller bearings 132 in contrast to the previously mentioned bearings the rolling bodies 80 are not spherical but conical. The conical stump 134 of the conical roller bearing 132 runs not on a bearing path 78, but lies on a wider bearing surface 136. The bearing surface 136 is formed, instead of on the bearing path 78, on the second bearing inner ring 96 and the second bearing outer ring 106. The bearing outer ring 106 and the bearing inner ring 96 are loosely constructed with one another and can be dismantled for mounting. As a result of both bearing rings being able to be dismantled, a greater number of rolling bodies 80 can be mounted than in the case of the groove ball bearing in FIG. 5.

The greater number of rolling bodies 80 and the wide bearing surface 136 have the effect that the conical roller bearings 132 can both in the radial direction 18 and also in the axial direction 16 be more highly loaded than a groove ball bearing 114, for the same structural size.

Figure 10:
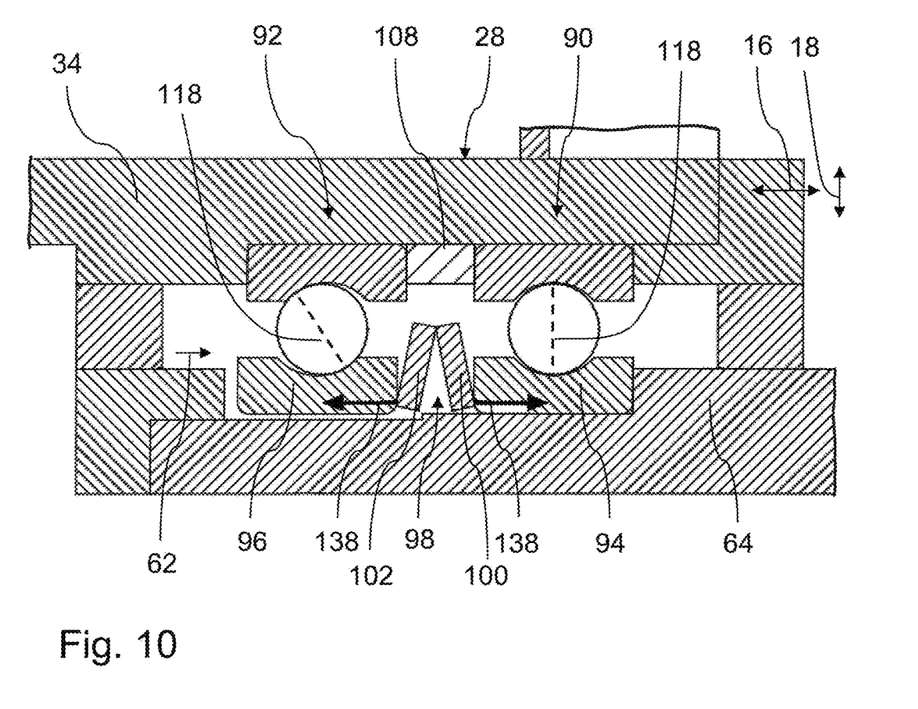
FIG. 10 shows the detail X according to FIG. 4 of a sixth variant.

FIG. 10 shows a bearing arrangement 28 according to the invention in which the two plate springs 100, 102 are each pretensioned with a pretension force 138. The first pretention force 138 of the plate springs 100, 102 presses already in the rest state of the solid bowl screw centrifuge 10 the two bearing inner rings 94, 96 in the axial direction outwards or apart. The two bearing inner rings 94, 96 are thus loaded in the rest state with this first pretension force 138 in the axial direction. The first pretention force 138 corresponds in the rest state to half of the axial force 62 of the solid bowl screw centrifuge 10 in the operating state at maximum loading. In the rest state of the solid bowl screw centrifuge 10, the first axial bearing 90 is loaded in the axial direction 16 opposite the second axial bearing 92 with the first pretension force 138.

The exemplary embodiment represented here shows the bearing arrangement 28 with the two axial bearings 90, 92 which is loaded with an axial force 62. The axial force corresponds to the pretention force 138. As is clear in the case of the first axial bearing 90, based on the running path 118 oriented with respect to the radial direction, the first axial bearing 90 does not take up any axial force 62. In the second axial bearing 92 it can be seen based on the oblique running path 18 with respect to the radial direction that the second axial bearing 92 takes up the axial force 62.

Figure 11:
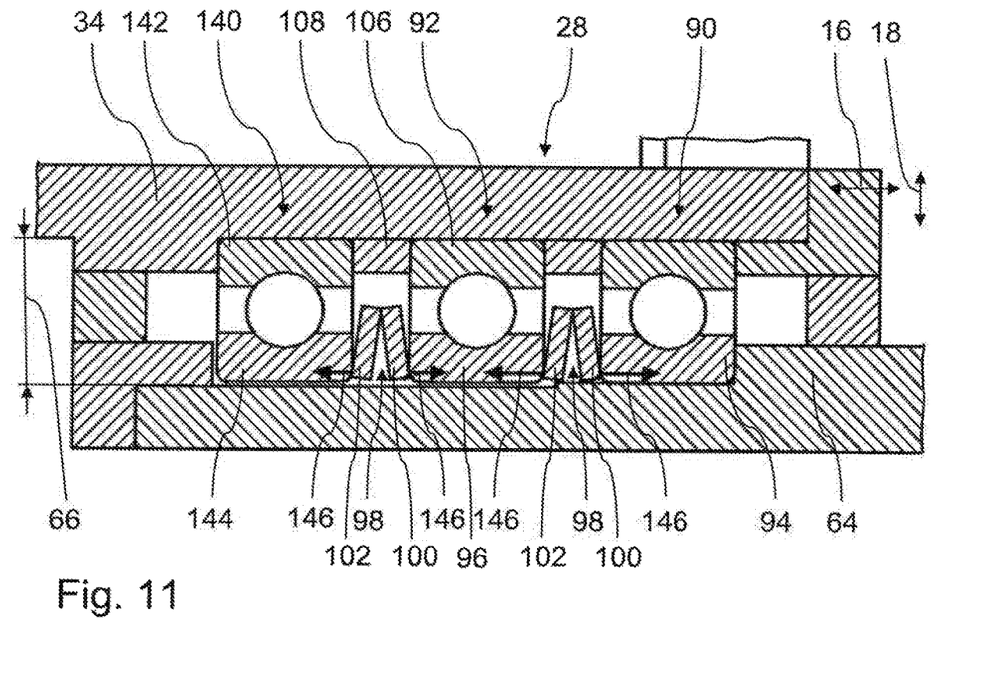
FIG. 11 shows the detail XI according to FIG. 4 of a seventh variant.

As can be seen in FIG. 11, the bearing arrangement 28 comprises a third axial bearing 140 and a further second elastic member 98 on which the third axial bearing 140 is supported in the axial direction 16. The third axial bearing 140 is connected in the axial direction 16 after the second axial bearing 92 in series with respect to the first and second axial bearing 90, 92. As already in the first and second axial bearing 90, 92, the third axial bearing 140 comprises a third bearing outer ring 142 and a third bearing inner ring 144. Between the second and the third bearing outer ring 96, 144 there is arranged in the axial direction 16 the elastic member. This elastic member 98 and the elastic member 98 between the first and second bearing inner ring 94, 96 are provided with a second pretension force 146. This second pretention force 146 corresponds in the rest state to a third of the axial force 62 of the solid bowl screw centrifuge 10 in the operating state at maximum loading. As the second axial bearing 92, also the third axial bearing 140 is not pressed onto the supporting region 64, but is held in the radial direction 18 by the supporting region 64. The second and third axial bearing 92, 140 are designed as loose bearings movable in the axial direction 16.

In this exemplary embodiment the axial force 62 is distributed by the screw hub 34 over the three axial bearings 90, 92, 140. Owing to the distribution of the axial force 62 over three axial bearings 90, 92, 140 the individual axial bearings 90, 92, 140 are dimensioned with a smaller height 66.

Finally it should be noted that all the characteristics which are mentioned in the application documents and in particular in the dependent claims, despite the formal reference back to one or more specific claims, individually or in any combination is intended to have independent protection.

LIST OF REFERENCE SYMBOLS 10 solid-bowl screw centrifuge
12 centrifuge axis
14 centrifuge drum
16 axial direction
18 radial direction
20 housing
22 first drum bearing
24 second drum bearing
26 drum cover
28 bearing arrangement
30 axial bearing
32 screw
34 screw hub
36 screw helix
38 screw bearing
40 inlet pipe
42 inlet space
44 mixed material
46 separating space
48 heavy phase
50 light phase
51 liquid state
52 pond depth
54 outlet opening
56 weir plate
58 discharge opening
60 conveying direction
62 axial force
64 supporting region
66 bearing height
68 wall thickness
70 outer diameter
72 inner diameter
74 bearing inner ring
76 fixing ring
78 bearing path
80 rolling body
82 bearing outer ring
84 fixing ring
86 ring seal
88 ring seal
90 first axial bearing
92 second axial bearing
94 first bearing inner ring
96 second bearing inner ring
98 elastic member
100 first plate spring
102 second plate spring
104 first bearing outer ring
106 second bearing outer ring 108 less-elastic member
110 non-elastic member
112 groove
114 groove ball bearing
116 spindle bearing
118 running path
120 pressure angle
122 angular contact ball bearing
124 four-point bearing
126 contact point
128 first half
130 second half
132 conical roller bearing
134 conical stump
136 bearing surface
138 first pretension force
140 third axial bearing
142 third bearing outer ring
144 third bearing inner ring
146 second pretension force

The invention claimed is:

1. A solid bowl screw centrifuge having a centrifuge axis, comprising:
    a screw disposed in a drum,
    a first bearing and an adjacent second bearing, both the first bearing and the second bearing being configured to transfer an axial force acting on the screw, and
    two plate springs arranged between the adjacent first axial bearing and the second bearing that deform when the axial force acts on the screw,
    wherein the two plate springs are each disposed at a non-zero angle with respect to a radial direction, the two angled plate springs being pretensioned to contact respective radial surfaces of the first bearing and the second bearing to thereby generate an axial pretension force which pushes the first axial bearing and the second bearing axially apart when the centrifuge is in a rest state.

2. The solid bowl screw centrifuge according to claim 1, wherein the first bearing and the second bearing each have a bearing inner ring and a bearing outer ring,
    wherein the two plate springs are arranged between the two bearing inner rings, and
    wherein an inelastic member is arranged between the two bearing outer rings.

3. The solid bowl screw centrifuge according to claim 2, wherein the bearing outer rings of the first bearing and the second bearing are arranged within a hub of the screw and pressed into the hub by a first fixing ring.

4. The solid bowl screw centrifuge according to claim 2, wherein the bearing inner ring of the first bearing is axially fixed and wherein the inner ring of the second bearing is axially movable.

5. The solid bowl screw centrifuge according to claim 1, wherein the first bearing and the second bearing each have a bearing inner ring and a bearing outer ring,
    wherein the two plate springs are arranged between the two bearing outer rings, and
    wherein an inelastic member is arranged between the two bearing inner rings.

6. The solid bowl screw centrifuge according to claim 1, wherein the second bearing is a spindle bearing and the first bearing is a groove ball bearing.

7. The solid bowl screw centrifuge according to claim 1, wherein the second bearing is an angular contact ball bearing and the first bearing is a groove ball bearing.

8. The solid bowl screw centrifuge according to claim 1, wherein the second bearing is an angular contact ball bearing and the first bearing is a four-point bearing.

9. The solid bowl screw centrifuge according to claim 1, wherein the second bearing is a conical roller bearing and the first bearing is a groove ball bearing.

10. The solid bowl screw centrifuge according to claim 1, further comprising
    a third bearing for taking up the axial force of the screw and
    further plate springs arranged between the second bearing and the third bearing.

11. The solid bowl screw centrifuge according to claim 10, wherein the further plate springs generate a pretension force which pushes the second bearing and the third bearing apart.

12. The solid bowl screw centrifuge according to claim 1, wherein the axial pretension force is between 2,500 and 300,000 Newton.

* * * * *